F. HANSON.
MARKER FOR CORN PLANTERS.
APPLICATION FILED SEPT. 12, 1919.
1,363,412.
Patented Dec. 28, 1920.
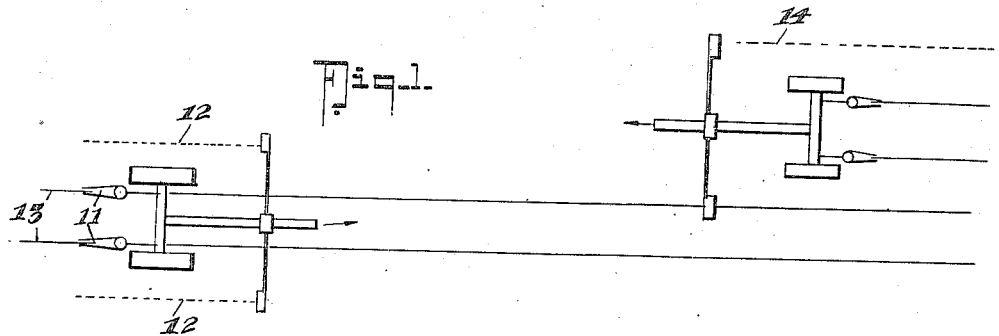
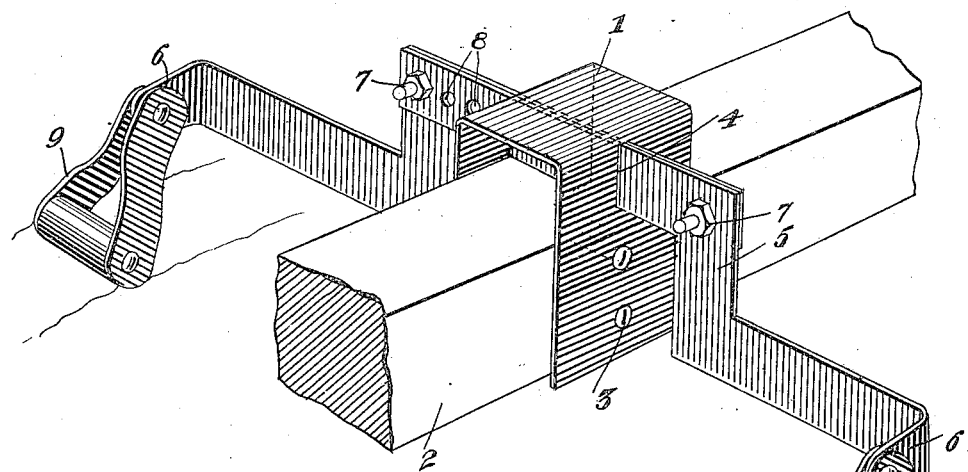
WITNESSES
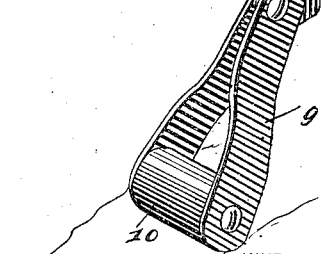
INVENTOR
Frederick Hanson.
BY
ATTORNEYS

UNITED STATES PATENT OFFICE.

FREDERICK HANSON, OF ANITA, IOWA.

MARKER FOR CORN-PLANTERS.

1,363,412.  Specification of Letters Patent.  Patented Dec. 28, 1920.

Application filed September 12, 1919. Serial No. 323,280.

*To all whom it may concern:*

Be it known that I, FREDERICK HANSON, a citizen of the United States, and a resident of Anita, in the county of Cass and State of Iowa, have invented certain new and useful Improvements in Markers for Corn-Planters, of which the following is a specification.

My invention relates to improvements in marking devices for farm implements, particularly corn planters, and it consists in the constructions, combinations and arrangements herein described and claimed.

The foremost object of my invention is to provide a simple device attachable to a cornplanter, for marking the rows to be planted.

Another object of my invention is to provide a marking device for the purpose described, which is light in action so as to avoid the usual objectionable drag on the horses.

Other objects and advantages will appear in the following specification, reference being had to the accompanying drawing, in which:

Figure 1 is a diagram showing how the improved marker is used, and

Fig. 2 is a perspective view of the improved marker, applied to the beam of a corn planter.

In carrying out my invention, I provide a yoke 1, which fits over the beam 2 of a corn planter, or other similar implement, it being secured in place by a plurality of fastening means 3. In the present instance, these consist of bolts which pass through suitable holes bored in the beam 2. The boring of these holes is the major operation required in applying the device to the corn planter, and this at the most requires but five minutes.

Slots 4, in transverse alinement and in the yoke 1, receive the oppositely adjustable marker arms 5, which are bent down adjacent to the yoke, and then at right angles at 6 at the extremities. Suitable securing means 7 fit in apertures 8 in the ends of the respective arms, and enable the lateral adjustment above referred to.

A stirrup 9 is pivoted on each extension 6, and carries a roller 10 which rolls on the ground and marks out a row to be planted. These rollers are heavy enough to leave a visible imprint that is not easily effaced even after a heavy rain.

In operation the marker is applied to the beam of the corn planter as outlined above, the rollers 10 being disposed beyond the sides of the machine a distance approximately equal to the distance between the planter plows 11. It can be seen at once in Fig. 1 that in planting the first row, guide lines 12 will be imprinted on the ground, these guide lines being as far from the two rows 13 then planted, as these rows are apart from each other.

When the operator makes the turn at the end of the field, the adjacent roller 10 will be kept in line with the row 13 at the top, two additional rows being planted, and another guide line or imprint 14 being left. It is thus that there is always a guide line which the operator can easily follow, and thus make corn planting a comparatively easy task.

Reversal of marker elements does not become necessary in this device, because there is a marker element at each side and one or the other functions at all times. In some marking devices, a reversal must be made each time the machine reaches the end of the field. The rollers 10 rolling over the ground instead of scratching a gage line, add but an imperceptible weight to be drawn by the horses.

There are two features of importance which should be added to the above and fully understood. Universally, markers of the present types are placed at the rear end of the planter and extend out to one side, thereby creating a side draft, whereas my improved marker is placed in front and extends at both sides, thereby preventing side draft.

The second feature of importance is that while one roller in my improved marker follows the last row planted, the other roller runs exactly where one of the horses has to walk. Instinctively the horse will follow the mark thus made so that the planter will positively be drawn straight. In all other markers the mark has to be straddled by the team and is of no use whatever as a gage line for a horse to follow.

While the construction and arrangement of the improved marker as herein described and claimed is that of a generally preferred form, obviously modifications and changes can be made without departing from the spirit of the invention or the scope of the claims.

I claim:—

1. A row marker, comprising a U-shaped yoke with means for securing it to the beam of a corn planter, and including slots in transverse alinement; planter arms inserted in the slots from opposite directions, and provided at the extremities with a series of perforations to receive securing means for lateral adjustment; right angular extensions on the outer extremities of the arms, stirrups pivoted thereon, and ground rollers journaled in the stirrups.

2. In combination, with a corn planter with a pair of planter plows and a beam, a row marker carried by the planter, comprising laterally adjustable marker arms, with means for operatively mounting them on the beam, and a ground roller with a stirrup mounting at each extremity of the arms, to roll a gage line on the ground at each side a distance from each planted row equal to the distance between the rows, one roller running over a planted row in returning, the other roller describing a fresh mark.

FREDERICK HANSON.